United States Patent
Bhatt et al.

(10) Patent No.: US 11,310,265 B2
(45) Date of Patent: Apr. 19, 2022

(54) DETECTING MAC/IP SPOOFING ATTACKS ON NETWORKS

(71) Applicant: HEWLETT PACKARD ENTERPRISE DEVELOPMENT LP, Houston, TX (US)

(72) Inventors: Arpit Bhatt, Bangalore (IN); Deepak Jain, Bangalore (IN)

(73) Assignee: Hewlett Packard Enterprise Development LP, Houston, TX (US)

( * ) Notice: Subject to any disclaimer, the term of this patent is extended or adjusted under 35 U.S.C. 154(b) by 140 days.

(21) Appl. No.: 16/803,950

(22) Filed: Feb. 27, 2020

(65) Prior Publication Data

US 2021/0273975 A1 Sep. 2, 2021

(51) Int. Cl.
*H04L 29/06* (2006.01)
*H04L 67/145* (2022.01)
*H04L 101/622* (2022.01)

(52) U.S. Cl.
CPC ...... *H04L 63/1466* (2013.01); *H04L 61/6022* (2013.01); *H04L 63/0236* (2013.01); *H04L 63/0876* (2013.01); *H04L 63/101* (2013.01); *H04L 63/1416* (2013.01); *H04L 63/1433* (2013.01); *H04L 63/166* (2013.01); *H04L 67/145* (2013.01)

(58) Field of Classification Search
CPC .......... H04L 63/1466; H04L 63/1416; H04L 63/1433; H04L 63/166; H04L 63/0236; H04L 63/101; H04L 63/0876; H04L 67/145; H04L 61/6022
See application file for complete search history.

(56) References Cited

U.S. PATENT DOCUMENTS

| | | | |
|---|---|---|---|
| 7,404,210 B2* | 7/2008 | Lin | H04L 63/1458 370/392 |
| 7,881,318 B2* | 2/2011 | Herzog | H04L 61/2553 370/401 |
| 9,338,192 B1* | 5/2016 | He | H04L 67/2814 |
| 2006/0075482 A1* | 4/2006 | Appanna | H04L 69/163 726/14 |
| 2006/0161980 A1* | 7/2006 | Huitema | H04L 63/1458 726/22 |

(Continued)

*Primary Examiner* — Sarah Su
(74) *Attorney, Agent, or Firm* — Sheppard Mullin Richter & Hampton LLP

(57) ABSTRACT

Systems and methods are provided for detecting MAC/IP spoofing attacks on networks. A method may include authenticating a network device for access to a network using a Media Access Control (MAC) address and an Internet Protocol (IP) address of the network device; wherein an attacking device is connected to the network, and to the network device, by a network hub; wherein the attacking device spoofs the MAC address and the IP address of the network device; establishing a Transport Control Protocol (TCP) connection with the network device subsequent to authenticating the network device; sending at least one TCP keepalive message to the IP address of the network device, wherein, responsive to receiving the TCP keepalive message, the attacking device transmits a TCP reset (RST) message; receiving the TCP RST message; and determining the attacking device is present in the network responsive to receiving the TCP RST message.

20 Claims, 5 Drawing Sheets

(56) References Cited

U.S. PATENT DOCUMENTS

| | | | |
|---|---|---|---|
| 2007/0160063 A1* | 7/2007 | Mynam | H04L 63/068 370/395.52 |
| 2007/0186282 A1* | 8/2007 | Jenkins | H04L 63/1416 726/22 |
| 2008/0144613 A1* | 6/2008 | Adhikari | H04L 63/1408 370/389 |
| 2009/0319665 A1* | 12/2009 | Moonen | H04L 69/16 709/227 |
| 2017/0244730 A1* | 8/2017 | Sancheti | H04W 12/06 |
| 2020/0356618 A1* | 11/2020 | Shribman | G06F 16/955 |
| 2021/0136063 A1* | 5/2021 | Cheek | G06Q 20/40145 |
| 2021/0211404 A1* | 7/2021 | Pandey | H04L 45/74 |

* cited by examiner

DETECTING MAC/IP SPOOFING ATTACKS ON NETWORKS

DESCRIPTION OF RELATED ART

The disclosed technology relates generally to network security, and more particularly some embodiments relate to detecting attacks on networks.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

The figures are not exhaustive and do not limit the present disclosure to the precise form disclosed.

DETAILED DESCRIPTION

Network endpoints can refer to network elements or devices that may communicate with each other in various ways using switching devices to relay messaging between such network endpoints across a network. Certain software/services can be used to provide enterprise-class protection, posture assessment, and/or health checks for these network endpoints. Deployment of such software/services can be effectuated via agents (dissolvable or persistent) or even through an agentless configuration that can perform more granular protection and posture/health checks ensuring greater levels of network endpoint compliance and network authorization versus traditional network access control (NAC) safeguards.

Figure 1:
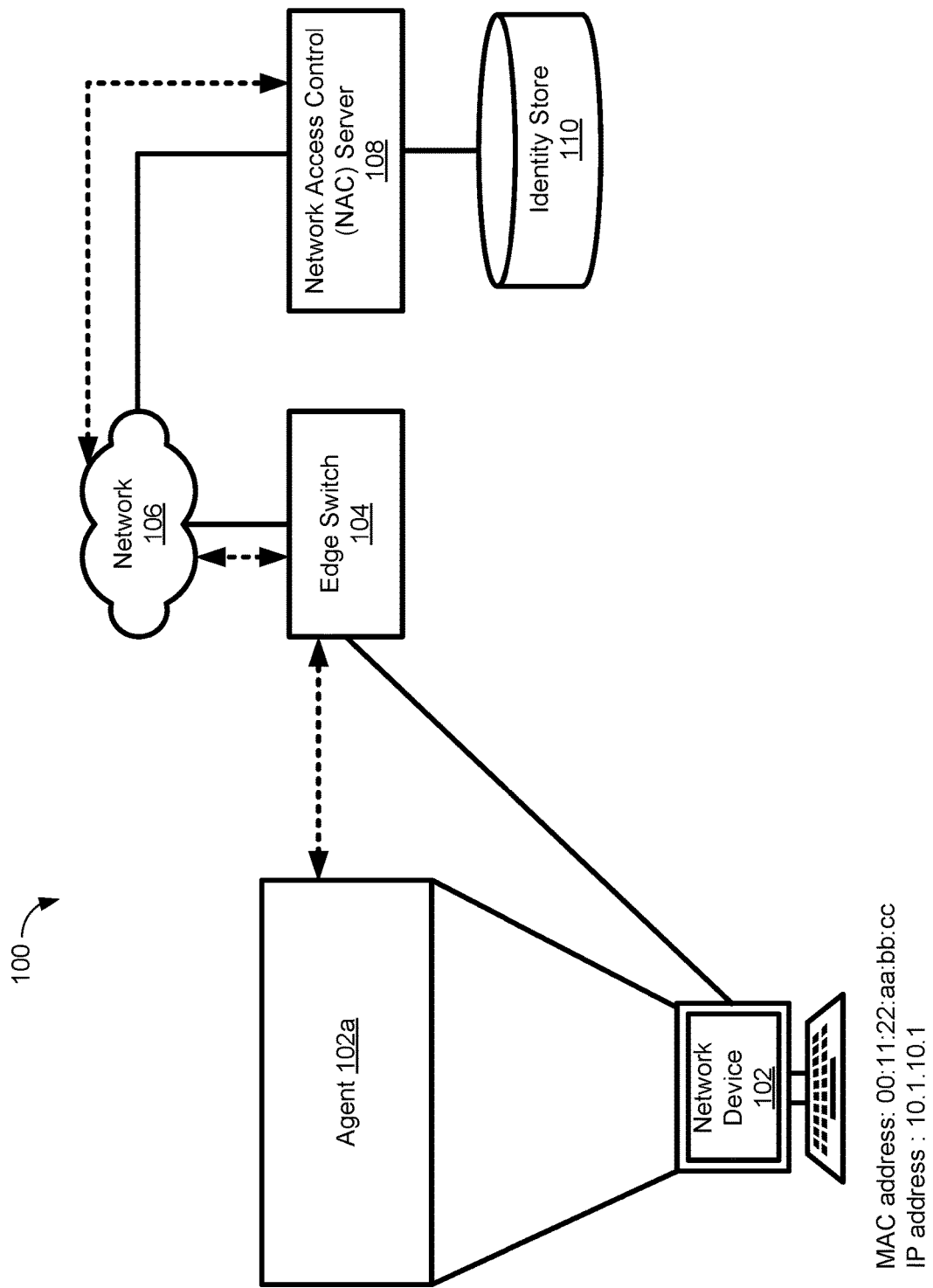
FIG. 1 illustrates an example network installation prior to an attack.

FIG. 1 illustrates an example network installation 100 in which an agent (e.g., posture/health client) 102a can provide such protections. In this example, the network installation 100 may include a network device 102 having a wired connection to an edge switch 104. The network device 102 may be implemented as any sort of device capable of communicating over a wired connection with the edge switch 104. For example, the network device 102 may be implemented as a laptop computer, desktop computer, workstation, smart phone, tablet, and the like. The wired connection between the network device 102 and the edge switch 104 may be implemented as an ethernet cable or the like. In the examples described herein, the network device 102 is described as having a MAC address of 00:11:22:aa:bb:cc, and an IP address of 10.1.10.1, as shown in FIG. 1.

The network installation 100 may include a secure network 106. The edge switch 104 may provide conditional access to the secure network 106. That is, the edge switch 104 may provide network device 102 (an example embodiment of a network endpoint) with access to the secure network 106 only after the network device 102 is authenticated by a network access control (NAC) server 108. The edge switch 104 may maintain an authentication status for each connected network endpoint, e.g., network device 102. For example, the edge switch 104 may maintain a status table that associates the MAC address of each network endpoint with that network endpoint's authentication status, as shown in Table 1 below. The edge switch may allow a network endpoint to connect to the network 106 only if the status table shows the network endpoint is authenticated. In some embodiments, the NAC server 108 may be implemented as a Remote Authentication Dial In User Service (RADIUS). RADIUS may provide a client/server protocol that runs in the application layer using Universal Datagram Protocol (UDP) as transport. RADIUS may serve as the backend for authentication processes compliant with IEEE 802.1X protocol.

The network installation 100 may include an identity store 110. The identity store 110 may store authentication credentials for use by the NAC server 108 in authenticating network devices 102. In some embodiments, the authentication credentials are compliant with the IEEE 802.1X protocol.

As will be described in greater detail below, some attacks to a network, such as network installation 100, may involve attacks at Open Systems Interconnection (OSI) layer 4, which may be missed by security measures at OSI layers 1-3. Accordingly, agent 102a of FIG. 1 may be adapted to detect OSI layer 4 attacks by communicating with an NAC server (e.g., NAC server 108) at regular intervals. Upon receiving these regular communications, an attacker or network endpoint that has been hacked (shown in FIG. 2), and is being used to spoof traffic will respond. These communications can be effectuated using a connection-based protocol. Thus, an attacker/hacked network endpoint's response would comprise an attempt to establish a connection to NAC server 108. NAC server 108, not being aware of why a connection is being established, would break the channel over which the attempted connection is to be established. NAC server 108 would then attempt to query the attacker/hacked network endpoint. However, as will also be explained in greater detail below, the NAC server 108 will receive a denial because the attacker/hacked network endpoint is not actually a legitimate member of network 100, and NAC server 108 will not have the requisite permissions to access the attacker/hacked network endpoint. This exchange would reveal the existence of the attacker/hacked network endpoint.

In particular, a network endpoint, e.g., network device 102, may first obtain access to the network, e.g., network 100 for example using 802.1X authentication with NAC server 108. Network device 102 may also then execute an agent (i.e., agent 102a) that establishes a Transmission Control Protocol (TCP) connection with NAC server 108. OSI layer 4, can refer to the transport layer that provides the transfer of data between end users, e.g., network endpoints, an example of which, again, is network device 102. This transport layer may control the reliability of a given link or connection through various mechanisms over a state and connection-oriented protocol. In this way, the transport layer is able to track failed communications, provide acknowledgement of successful data transmission, etc. One example of a connection-oriented protocol that can be used in the transport layer/OSI layer 4 is TCP.

The NAC server 108 may keep this TCP connection active by sending TCP keepalive messages to the IP address of the network device. Because the attacking device (shown in FIG. 2) is spoofing the IP address of the network device 102, these messages will be received by both the network device 102 and the attacking device. But being unaware of the TCP connection, the attacking device will respond with a TCP reset (RST) message, thereby breaking the TCP connection. The break of this healthy connection may indicate the presence of the attacking device in network 100. On detecting this break, NAC server 108 may take one or more actions, for example such as disconnecting both devices (network device 102 and the attacking device) from network 100, quarantining both devices, notifying a system administrator, and the like. Quarantining the devices may include modifying the role of the devices, changing the Virtual Local Access Network (VLAN) of the devices to a restricted access VLAN, and the like.

In some embodiments, responsive to detecting the break of the TCP connection, the NAC server 108 may confirm the presence of the attacking device prior to taking any action. In particular, the NAC server 108 may send a Windows Management Instrumentation (WMI) query to the IP address shared by the network device 102 and the attacking device. The WMI query may include a Domain Credential that is configured in NAC Server 108. Belonging to the network domain, the network device 102 can accept the Domain Credential, and will provide a proper response to the WMI query. However, not belonging to the network domain, the attacking device will not accept the Domain Credential (i.e., NAC server 108 will not have the proper credentials/permissions, and so will provide no response. Upon receiving no response to the WMI query from the attacking device within a predetermined period, the NAC server 108 will generate an "Access Denied" error, thereby confirming the presence of the attacking device in the network.

Figure 2:
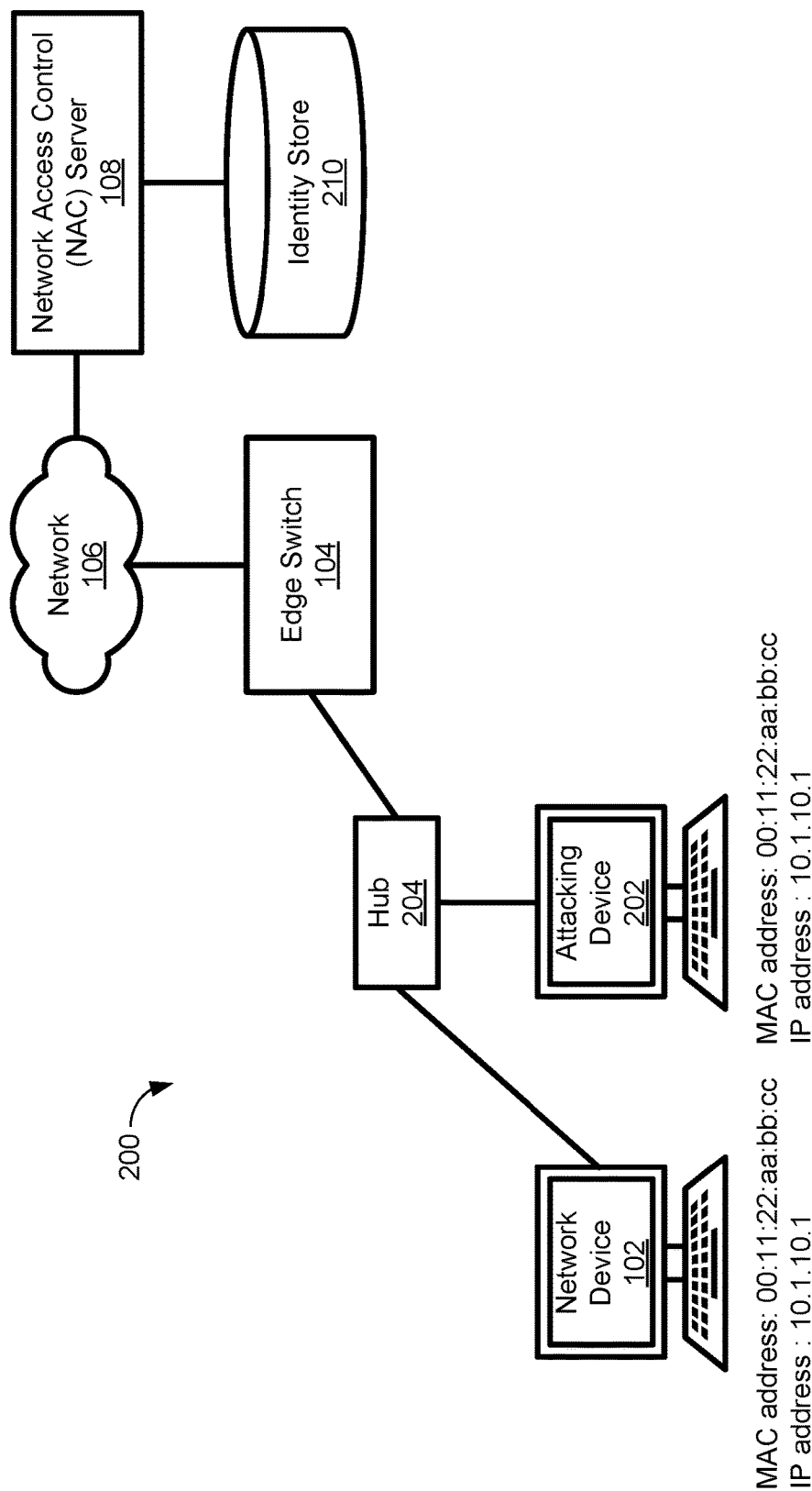
FIG. 2 illustrates the example network installation of FIG. 1 during an attack where the attacker has physical access to the network installation.

Referring to FIG. 2, while well-protected from attackers attempting to access the network 106 wirelessly, the network 106 may be vulnerable to an attacker with physical access to the network 106. In particular, an attacker may provide an attacking device such as a laptop computer, and may use the attacking device to spoof the MAC and IP addresses of the network device 102. The attacker may then connect the attacking device to a hub, and may connect the hub between the network device 102 and the edge switch 104, for example using ethernet cables. At this point the attacking device appears to be the same as the network device 102, and therefore cannot be detected by conventional techniques. FIG. 2 illustrates the example network installation 100 of FIG. 1 during an attack where the attacker has physical access to the network installation 100. Referring to FIG. 2, the attacker has connected a hub 204 between the network device 102 and the edge switch 104, and has connected an attacking device 202 to the hub 204, all using wired connections such as ethernet cables, and the like.

The attacker spoofs the MAC address and IP address of the network device 102 prior to connecting the attacking device 202. The attacker may obtain the MAC address and IP address of the network device 102 through any method. For example, the attacker may observe packets exchanged between the network device 102 and the edge switch 104, and may obtain the MAC address and IP address from those packets. After obtaining the MAC and IP addresses of the network device 102, the attacker programs those addresses into the attacking device 202. However, the disclosed technology is independent of the manner in which the MAC and IP addresses are spoofed. The attacking device 202 now has the same MAC and IP addresses as the network device 102, namely the MAC address of 00:11:22:aa:bb:cc, and the IP address of 10.1.10.1, as shown in FIG. 2.

The attacker has now bypassed the authentication mechanism of the NAC server 108. As a result, the attacking device 202 is now indistinguishable from the network device 102 to the edge switch 104 in the network installation 100. Therefore, the edge switch 104 allows the attacking device 202 to access the network 106. As noted above, this attack cannot be detected by conventional methods. As a result, the attack may have a long duration, and may cause considerable damage to the network installation 100.

Figure 3:
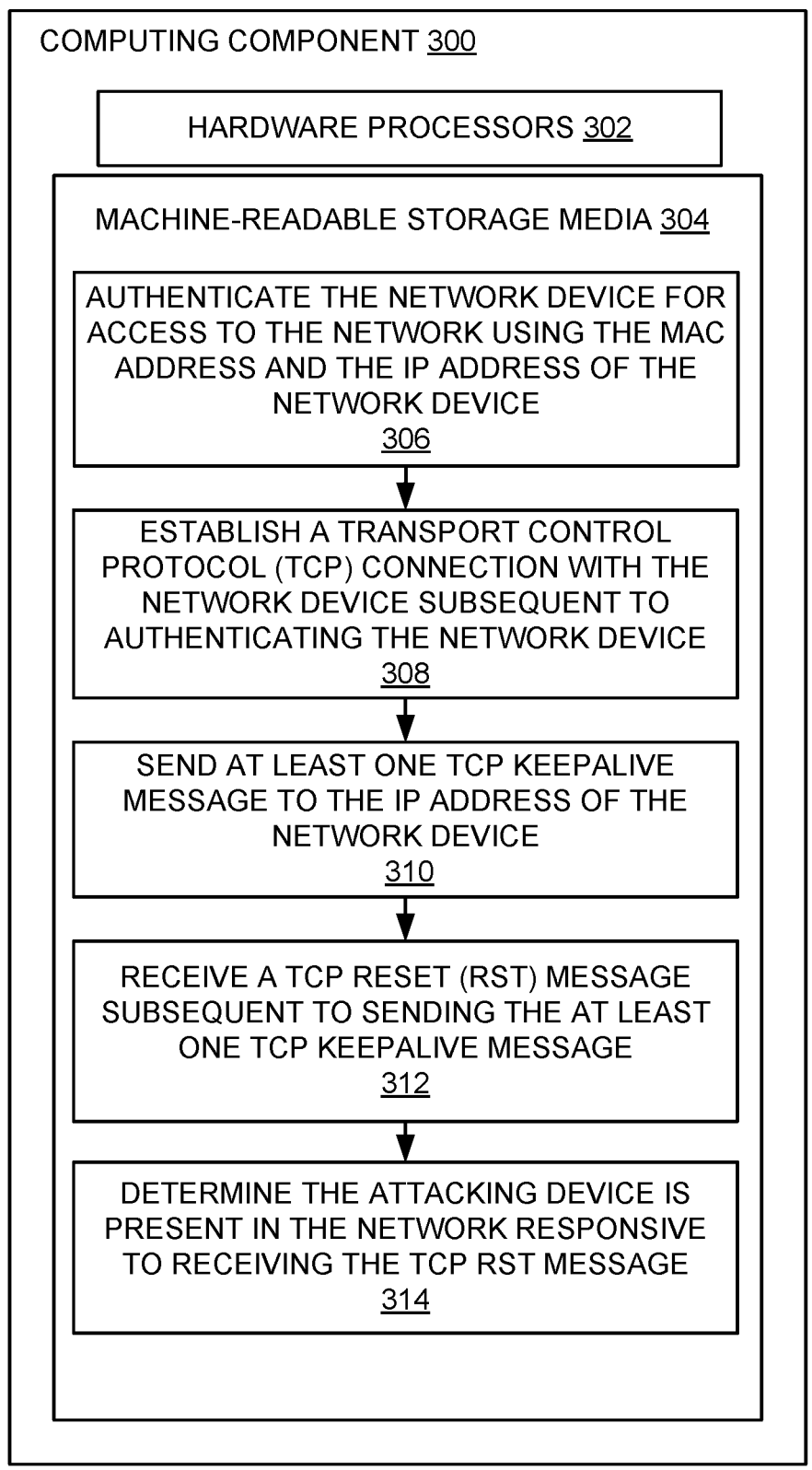
FIG. 3 is a block diagram of an example computing component or device for practicing embodiments of the disclosed technology in accordance with one embodiment.

FIG. 3 is a block diagram of an example computing component or device 300 for practicing embodiments of the disclosed technology in accordance with one embodiment. Computing component 300 may be, for example, a server computer, a controller, or any other similar computing component capable of processing data. In the example implementation of FIG. 3, the computing component 300 includes a hardware processor 302, and machine-readable storage medium 304. In some embodiments, computing component 300 may be an embodiment of the NAC server 108 of the network installation 100 of FIGS. 1 and 2.

Hardware processor 302 may be one or more central processing units (CPUs), semiconductor-based microprocessors, and/or other hardware devices suitable for retrieval and execution of instructions stored in machine-readable storage medium, 304. Hardware processor 302 may fetch, decode, and execute instructions, such as instructions 306-314, to control processes or operations for practicing embodiments of the disclosed technology. As an alternative or in addition to retrieving and executing instructions, hardware processor 302 may include one or more electronic circuits that include electronic components for performing the functionality of one or more instructions, such as a field programmable gate array (FPGA), application specific integrated circuit (ASIC), or other electronic circuits.

A machine-readable storage medium, such as machine-readable storage medium 304, may be any electronic, magnetic, optical, or other physical storage device that contains or stores executable instructions. Thus, machine-readable storage medium 304 may be, for example, Random Access Memory (RAM), non-volatile RAM (NVRAM), an Electrically Erasable Programmable Read-Only Memory (EEPROM), a storage device, an optical disc, and the like. In some embodiments, machine-readable storage medium 304 may be a non-transitory storage medium, where the term "non-transitory" does not encompass transitory propagating signals. As described in detail below, machine-readable storage medium 304 may be encoded with executable instructions, for example, instructions 306-314. Depending on the implementation, the instructions may include additional, fewer, or alternative instructions, and may be performed in various orders or in parallel.

The hardware processor 302 may execute instructions 306 to authenticate the network device for access to the network using the MAC address and the IP address of the network device. For example, referring to the network installation 100 of FIG. 1, the NAC server 108 may challenge the network device 102 to provide authentication credentials. In some embodiments, authenticating the network device 102 may comply with the IEEE 802.1X standard. In response to the challenge, the network device 102 may provide suitable authentication credentials. The NAC server 108 may receive the authentication credentials from the network device 102, and may compare the authentication credentials to a plurality of authentication credentials stored in the identity store

110. The NAC server 108 may authenticate the network device responsive to finding a match between the credentials provided by the network device 102 and one of the credentials stored in the identity store 110. In some embodiments, the identity store 110 may be implemented as an Active Directory identity store. However, the identity store 110 may be implemented in other ways.

Upon successfully authenticating the network device 102, the NAC server 108 grants access to the network 106. In some embodiments, the NAC server 108 may modify a network access table stored in the edge switch 104. For example, the NAC server 108 may add the entry shown in Table 1.

TABLE 1

| MAC Address | Username | State | Method |
|---|---|---|---|
| 00:11:22:aa:bb:cc | 6@example.com | Authenticated | 802.1X |

As shown in Table 1, the entry may include an authentication state of "authenticated" for the MAC address of the network device 102. The entry may also include additional information, such as a username, authentication method, and the like, as shown in Table 1. At this point, the edge switch 104 allows the network device 102 to access the network 106.

The hardware processor 302 may execute instructions 308 to establish a Transport Control Protocol (TCP) connection with the network device subsequent to authenticating the network device. For example, referring to FIG. 1, the NAC server 108 may establish the TCP connection with the network device 102. The TCP connection may be established, for example, on port 6689 of the NAC server 108. In other embodiments, the TCP connection may be established on other ports of the NAC server 108. In various embodiments, the establishment of the TCP connection may be initiated by the NAC server 108 or the network device 102.

Figure 4:
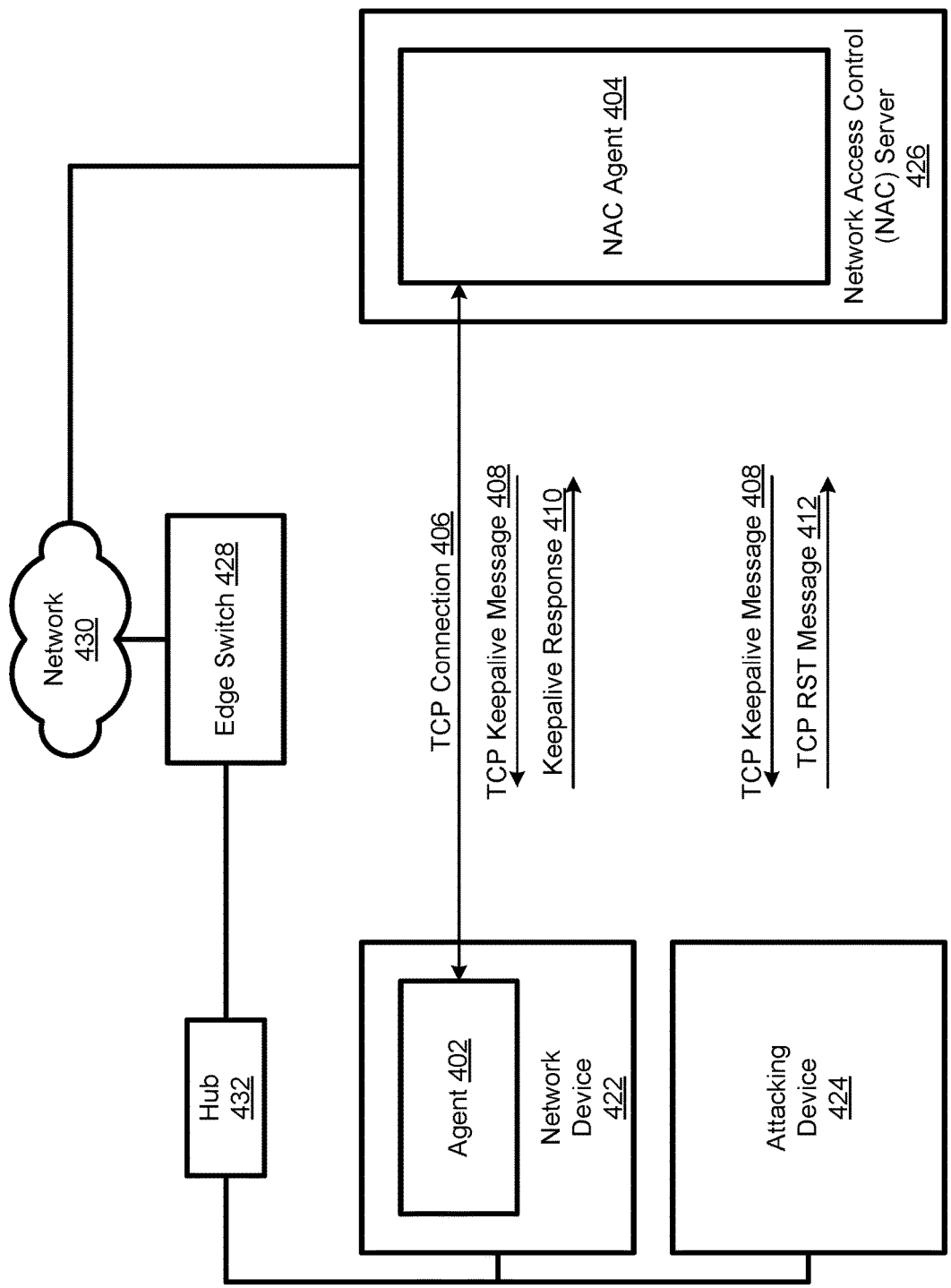
FIG. 4 illustrates communications between the NAC server, the network device, and the attacking device of FIGS. 1 and 2 according to embodiments of the disclosed technology.

FIG. 4 illustrates communications between a NAC server 426, a network device 422, and an attacking device 424 according to embodiments of the disclosed technology. The NAC server 426, network device 422, and attacking device 424 of FIG. 4 may be similar to the NAC server 108, network device 102, and attacking device 202 of FIGS. 1 and 2, respectively. Also shown in FIG. 4 are an edge switch 428, a network 430, and a hub 432, which may be similar to the edge switch 104, network 106, and hub 204 of FIGS. 1 and 2, respectively.

Referring to FIG. 4, both the network device 422 and the attacking device 424 may have respective wired connections to the hub 432, which may have wired connections to the edge switch 428. The edge switch 428 and the NAC server 426 may have respective connections to the network 430. An agent 402 may execute within the network device 422. A corresponding NAC agent 404 may execute within the NAC server 426. The agent 402, and the NAC agent 404, may be implemented as software processes executed by respective processors of the network device 422 and the NAC server 426. In various embodiments, the TCP connection 406 between the network device 422 and the NAC server 426 may be established between the agent 402 and the NAC agent 404. The agent 402, and the NAC agent 404, may perform one or more of the functions described below.

Referring again to FIG. 3, the hardware processor 302 may execute instructions 310 to send at least one TCP keepalive message to the IP address of the network device. For example, referring to FIG. 4, the NAC agent 404 executing within the NAC server 426 may transmit a TCP keepalive message 408 to the IP address of the network device 422. The TCP keepalive messages 408 may be sent at regular intervals, responsive to the occurrence of certain events, and the like.

In the described embodiments, the TCP message is a TCP keepalive message. However, in other embodiments, other TCP messages may be sent instead of, or in addition to, the TCP keepalive messages. Any TCP message will provoke the attacking device 424 to send TCP RST message, which indicates the presence of the attacking device 424 in the network installation 100.

Because the attacking device 424 is spoofing the IP address of the network device 422, the TCP keepalive messages are received by both the network device 422 and the attacking device 424. The network device 422, being aware of the TCP connection 406, sends a proper TCP keepalive response 410 to the NAC server 426. But because TCP is a connection-oriented protocol, the attacking device 424 is unaware of the TCP connection 406. Therefore, the attacking device 424, being unaware of the TCP connection 406, sends a TCP reset (RST) message 412 to the NAC server 426.

Referring again to FIG. 3, the hardware processor 302 may execute instructions 312 to receive the TCP RST message subsequent to sending the at least one TCP keepalive message. For example, referring again to FIG. 4, the NAC server 426 may receive the TCP RST message 412 from the attacking device 424. Receipt of the TCP RST message 412 at the NAC server 426 indicates that an attacking device 424 is present in the network 430. In particular, receipt of the TCP RST message 412 at the NAC server 426 breaks the healthy TCP connection 406 between the NAC server 426 and the network device 422. This break indicates the presence of the attacking device 424 in the network installation 100.

Referring again to FIG. 3, the hardware processor 302 may execute instructions 314 to determine the attacking device is present in the network responsive to receiving the TCP RST message. For example, referring again to FIG. 4, the NAC server 426 may determine the attacking device is present in the network responsive to receiving the TCP RST message 412.

In some embodiments, the NAC server 426 may perform one or more actions responsive to determining the attacking device is present in the network. The actions may include disconnecting, from the network 106, all of the network devices using the MAC address of the network device 422. This action would disconnect both the network device 422, and the attacking device 424, from the network 430.

The actions may include quarantining all network devices using the MAC address of the network device. This action would restrict access to the network 106 for both the network device 422 and the attacking device 424. Quarantining the devices may include modifying the role of the devices, changing the Virtual Local Access Network (VLAN) of the devices to a restricted access VLAN, and the like.

The actions may include notifying an administrator of the network 106. This action may allow the administrator to locate and detain the attacker before the attacker knows he has been detected. The action listed above, and other actions, may be performed alone or in various combinations.

In some embodiments, the presence of the attacking device 424 in the network 106 may be confirmed. For example, the presence of the attacking device 424 may be confirmed responsive to detecting the presence of the attacking device, and prior to taking action.

In some embodiments, the presence of the attacking device 424 may be confirmed by sending further TCP messages, which may be TCP keepalive messages or other messages, and monitoring for further TCP RST messages sent by the attacking device 424 in response. In such embodiments, the frequency of the messages may be increased to reduce the time required to confirm the presence of the attacking device 424. In some embodiments, a confirmation threshold may be set, and the presence of the attacking device 424 may be confirmed when the number of TCP RST messages received exceeds the confirmation threshold.

For example, responsive to receiving the TCP RST message 412, and prior to performing the action, the NAC server 426 may send one or more Windows Management Instrumentation (WMI) queries to the IP address of the network device 422. Belonging to the network domain, the network device 422 will provide a proper response to each WMI query. However, not belonging to the network domain, the attacking device 424 may provide an improper response, thereby confirming the presence of the attacking device 424 in the network 430. Responsive to receiving improper responses to one or more WMI queries, the NAC server 426 may take action, for example as described above. For example, the NAC server 426 may mark the network device 422 with the attribute "Collision detection=true" which may provoke subsequent action. In some embodiments, a confirmation threshold may be set, and the presence of the attacking device 424 may be confirmed when the number of improper responses received exceeds the confirmation threshold.

Some embodiments may employ the IEEE 802.1AE, also known as "MACsec," for additional security. MACSec may encrypt communications between the network device 422 and the edge switch 104. MACsec makes IP and MAC spoofing more difficult because an attacker must break the encryption in order to obtain the IP and MAC addresses by sniffing the packets.

Embodiments of the disclosed technology possess several advantages over conventional approaches. Conventional methods for detecting MAC and IP spoofing rely upon techniques deployed at OSI layers 1-3. These techniques are incapable of detecting the attacks described herein. The disclosed technology operates at OSI layer 4, and detects such attacks using a new and unconventional approach involving the use of a special-purpose TCP connection.

The disclosed technology may detect the attack quickly, before the attacker has had sufficient time to cause damage to the network and its resources. The detection time depends upon the frequency of sending TCP keepalive messages. By increasing this frequency, an attack may be detected, and acted upon, in less than 30 seconds.

The disclosed technology may detect the attack without alerting the attacker, thereby allowing the attacker to be apprehended.

The disclosed technology may be implemented without the use of additional hardware. Instead, the disclosed technology may employ software agents that execute on existing hardware in the network.

Network auditors are increasingly using the attack described herein to invalidate a network deployment. The disclosed technology detects such attacks quickly, resulting in a successful network deployment.

Embodiments of the disclosed technology may be implemented in any manner. For example, in some embodiments, a network installation may implement the Aruba ClearPass Policy Manager platform, and one or more of the described agents may be implemented as Aruba ClearPass OnGuard agents.

Figure 5:
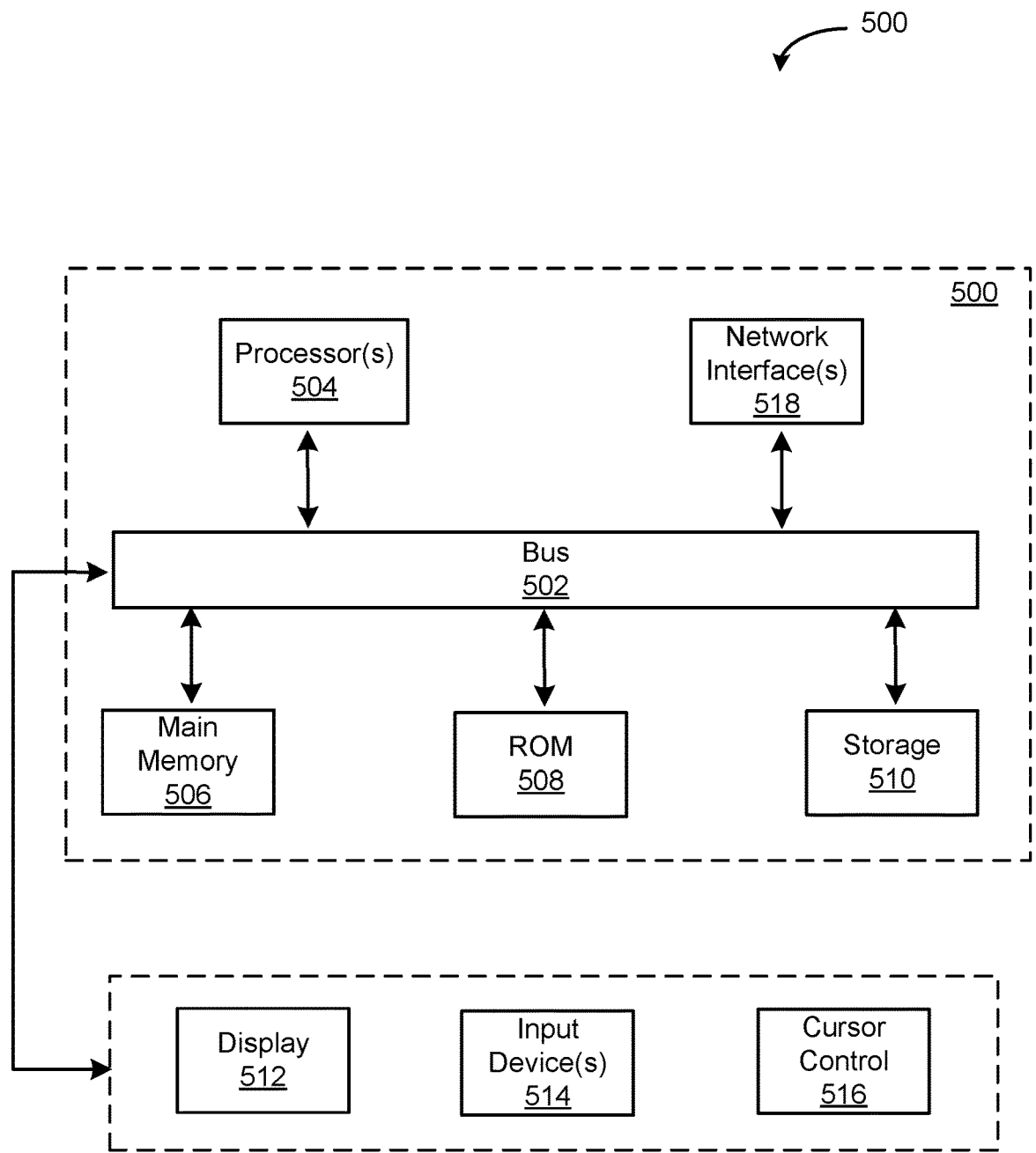
FIG. 5 is an example computing component that may be used to implement various features of embodiments described in the present disclosure.

FIG. 5 depicts a block diagram of an example computer system 500 in which embodiments described herein may be implemented. The computer system 500 includes a bus 502 or other communication mechanism for communicating information, one or more hardware processors 504 coupled with bus 502 for processing information. Hardware processor(s) 504 may be, for example, one or more general purpose microprocessors.

The computer system 500 also includes a main memory 506, such as a random access memory (RAM), cache and/or other dynamic storage devices, coupled to bus 502 for storing information and instructions to be executed by processor 504. Main memory 506 also may be used for storing temporary variables or other intermediate information during execution of instructions to be executed by processor 504. Such instructions, when stored in storage media accessible to processor 504, render computer system 500 into a special-purpose machine that is customized to perform the operations specified in the instructions.

The computer system 500 further includes a read only memory (ROM) 508 or other static storage device coupled to bus 502 for storing static information and instructions for processor 504. A storage device 510, such as a magnetic disk, optical disk, or USB thumb drive (Flash drive), etc., is provided and coupled to bus 502 for storing information and instructions.

In general, the word "component," "engine," "system," "database," data store," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor(s) 504 executing one or more sequences of one or more instructions contained in main memory 506. Such instructions may be read into main memory 506 from another storage medium, such as storage device 510. Execution of the sequences of instructions contained in main memory 506 causes processor(s) 504 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 510. Volatile media includes dynamic memory, such as main memory 506. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 502. Transmission media can also take the form of acoustic or light waves, such as those generated during radio-wave and infra-red data communications.

The computer system 500 also includes a display 512, input device(s) 514, cursor control 516, and a communication interface 518 coupled to bus 502. Network interface 518 provides a two-way data communication coupling to one or more network links that are connected to one or more local networks. For example, communication interface 518 may be an integrated services digital network (ISDN) card, cable modem, satellite modem, or a modem to provide a data communication connection to a corresponding type of telephone line. As another example, network interface 518 may be a local area network (LAN) card to provide a data communication connection to a compatible LAN (or a WAN component to communicate with a WAN). Wireless links may also be implemented. In any such implementation, network interface 518 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet." Local network and Internet both use electrical, electromagnetic or optical signals that carry digital data streams. The signals through the various networks and the signals on network link and through communication interface 518, which carry the digital data to and from computer system 500, are example forms of transmission media.

The computer system 500 can send messages and receive data, including program code, through the network(s), network link and communication interface 518. In the Internet example, a server might transmit a requested code for an application program through the Internet, the ISP, the local network and the communication interface 518.

The received code may be executed by processor 504 as it is received, and/or stored in storage device 510, or other non-volatile storage for later execution.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed example embodiments. The performance of certain of the operations or processes may be distributed among computer systems or computers processors, not only residing within a single machine, but deployed across a number of machines.

As used herein, a circuit might be implemented utilizing any form of hardware, or a combination of hardware and software. For example, one or more processors, controllers, ASICs, PLAs, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits are required to implement such features or functionality. Where a circuit is implemented in whole or in part using software, such software can be implemented to operate with a computing or processing system capable of carrying out the functionality described with respect thereto, such as computer system 500.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. A system, comprising:
a hardware processor; and
a non-transitory machine-readable storage medium encoded with instructions executable by the hardware processor to perform a method comprising:
authenticating a network device for access to a network using a Media Access Control (MAC) address and an Internet Protocol (IP) address of the network device;
wherein an attacking device is connected to the network, and to the network device, by a network hub;
wherein the attacking device spoofs the MAC address and the IP address of the network device;
establishing a Transport Control Protocol (TCP) connection with the network device subsequent to authenticating the network device;
sending at least one TCP keepalive message to the IP address of the network device, wherein, responsive to receiving the TCP keepalive message, the attacking device transmits a TCP reset (RST) message;
receiving the TCP RST message; and
determining the attacking device is present in the network responsive to receiving the TCP RST message.

2. The system of claim 1, the method further comprising:
performing an action responsive to determining the attacking device is present in the network, wherein the action comprises at least one of:
disconnecting, from the network, all network devices using the MAC address of the network device,
quarantining all network devices using the MAC address of the network device, and
notifying an administrator of the network.

3. The system of claim 1, the method further comprising:
sending a Windows management instrumentation (WMI) query to the IP address responsive to receiving the TCP RST message, and prior to performing the action; and
performing the action responsive to receiving an improper response to the WMI query.

4. The system of claim 1, wherein:
the attacker and the network device are connected to a network hub; and
the network hub is connected to an edge switch in the network.

5. The system of claim 1, wherein the authenticating the network device for access to the network complies with the IEEE 802.1X standard.

6. The system of claim 1, wherein the authenticating the network device for access to the network comprises:
receiving authentication credentials from the network device; and
comparing the authentication credentials to a plurality of authentication credentials stored in an identity store.

7. The system of claim 6, wherein the identity store comprises an Active Directory store.

8. A non-transitory machine-readable storage medium encoded with instructions executable by a hardware processor of a computing component, the machine-readable storage medium comprising instructions to cause the hardware processor to perform a method comprising:
authenticating a network device for access to a network using a Media Access Control (MAC) address and an Internet Protocol (IP) address of the network device;
wherein an attacking device is connected to the network, and to the network device, by a network hub;
wherein the attacking device spoofs the MAC address and the IP address of the network device;
establishing a Transport Control Protocol (TCP) connection with the network device subsequent to authenticating the network device;
sending at least one TCP keepalive message to the IP address of the network device, wherein, responsive to receiving the TCP keepalive message, the attacking device transmits a TCP reset (RST) message;
receiving the TCP RST message; and
determining the attacking device is present in the network responsive to receiving the TCP RST message.

9. The medium of claim 8, the method further comprising:
performing an action responsive to determining the attacking device is present in the network, wherein the action comprises at least one of:
disconnecting, from the network, all network devices using the MAC address of the network device,
quarantining all network devices using the MAC address of the network device, and
notifying an administrator of the network.

10. The medium of claim 8, the method further comprising:
sending a Windows management instrumentation (WMI) query to the IP address responsive to receiving the TCP RST message, and prior to performing the action; and
performing the action responsive to receiving an improper response to the WMI query.

11. The medium of claim 8, wherein:
the attacker and the network device are connected to a network hub; and
the network hub is connected to an edge switch in the network.

12. The medium of claim 8, wherein the authenticating the network device for access to the network complies with the IEEE 802.1X standard.

13. The medium of claim 8, wherein the authenticating the network device for access to the network comprises:
receiving authentication credentials from the network device; and
comparing the authentication credentials to a plurality of authentication credentials stored in an identity store.

14. The medium of claim 13, wherein the identity store comprises an Active Directory store.

15. A method comprising:
authenticating a network device for access to a network using a Media Access Control (MAC) address and an Internet Protocol (IP) address of the network device;
wherein an attacking device is connected to the network, and to the network device, by a network hub;
wherein the attacking device spoofs the MAC address and the IP address of the network device;
establishing a Transport Control Protocol (TCP) connection with the network device subsequent to authenticating the network device;
sending at least one TCP keepalive message to the IP address of the network device, wherein, responsive to receiving the TCP keepalive message, the attacking device transmits a TCP reset (RST) message;
receiving the TCP RST message; and
determining the attacking device is present in the network responsive to receiving the TCP RST message.

16. (Original The method of claim 15, further comprising:
performing an action responsive to determining the attacking device is present in the network, wherein the action comprises at least one of:
disconnecting, from the network, all network devices using the MAC address of the network device,
quarantining all network devices using the MAC address of the network device, and
notifying an administrator of the network.

17. The method of claim 15, further comprising:
sending a Windows management instrumentation (WMI) query to the IP address responsive to receiving the TCP RST message, and prior to performing the action; and
performing the action responsive to receiving an improper response to the WMI query.

18. The method of claim 15, wherein:
the attacker and the network device are connected to a network hub; and
the network hub is connected to an edge switch in the network.

19. The method of claim 15, wherein the authenticating the network device for access to the network complies with the IEEE 802.1X standard.

20. The method of claim 15, wherein the authenticating the network device for access to the network comprises:
receiving authentication credentials from the network device; and
comparing the authentication credentials to a plurality of authentication credentials stored in an identity store.

* * * * *